United States Patent
Ayat et al.

(10) Patent No.: US 6,904,232 B1
(45) Date of Patent: Jun. 7, 2005

(54) METHOD AND APPARATUS FOR SEEKING THE BURST CUTTING AREA OF DVD MEDIA

(75) Inventors: Mehran Ayat, Los Altos, CA (US); Nedi Nadershahi, Pleasanton, CA (US)

(73) Assignee: Zoran Corporation, Sunnyvale, CA (US)

(*) Notice: Subject to any disclaimer, the term of this patent is extended or adjusted under 35 U.S.C. 154(b) by 0 days.

(21) Appl. No.: 09/542,233

(22) Filed: Apr. 4, 2000

(51) Int. Cl.[7] .............................. H04N 5/85; H04N 7/64
(52) U.S. Cl. ................... 386/125; 386/113; 386/114
(58) Field of Search ................................. 386/125, 126, 386/124, 45, 40, 113, 114, 100, 95, 78, 76, 21, 19, 46, 1; H04N 5/85, 7/64

(56) References Cited

U.S. PATENT DOCUMENTS

| | | | |
|---|---|---|---|
| 5,088,075 A | * | 2/1992 | Yokota .................... 369/30.16 |
| 5,519,678 A | * | 5/1996 | Park |
| 6,519,213 B1 | * | 2/2003 | Song et al. ............... 369/44.26 |
| 6,608,804 B2 | * | 8/2003 | Shim |
| 6,622,132 B1 | * | 9/2003 | Oshima et al. |
| 6,708,299 B1 | * | 3/2004 | Xie ............................ 714/718 |

* cited by examiner

*Primary Examiner*—Robert Chevalier
(74) *Attorney, Agent, or Firm*—Morgan, Lewis & Bockius LLP

(57) ABSTRACT

Methods and apparatus for reading data from the burst cutting area of a digital video disc. The present location of an optical head assembly is determined. The distance from the present location of the optical head assembly to the burst cutting area is calculated. The optical head assembly is moved by the calculated distance toward the burst cutting area. Data stored in the burst cutting area is read. The read data is checked for error. Repeat until there is no error in the data.

9 Claims, 6 Drawing Sheets

METHOD AND APPARATUS FOR SEEKING THE BURST CUTTING AREA OF DVD MEDIA

BRIEF DESCRIPTION OF THE INVENTION

This invention relates generally to optical recording. More particularly, this invention relates to methods and apparatus for reading optically encoded data from a disk.

BACKGROUND OF THE INVENTION

Personal computers can be connected to an optical disc drive to read data from a disc, such as a digital video disc (DVD). On the disc, data is typically stored in the form of pits and lands patterned in a radial track. The track is formed as a spiral extending from the inner edge of the disc to its outer edge. A pit is a location in the track where data have been recorded by creating a depression in the surface of the disc with respect to the lands. The lands are the areas between the pits in the tangential direction. The reflectivity of the pits is less than the reflectivity of the lands. To store audio or digital information, the length of the pits and lands are controlled according to a predefined encoding format.

Some DVDs have two general areas: a main storage area and a burst cutting area. In the main storage area, information is written on predetermined regions of the spiral track. DVDs can store any one or a combination of video, audio and data signals in the main storage area In the burst cutting area (BCA), located near the disc hub, a code (the so-called BCA code) is written. The BCA code typically stores disc identification information (e.g., serial number of the disc, title of the disc, etc.). Generally, disc identification information is recorded in the BCA after completion of the disc manufacturing process by a high-power system, such as a laser system. The BCA can store code of about twelve to 188 bytes in size and in 16-byte increments. BCA code is usually arranged in a series of low reflectance stripes arranged in the circumferential direction. Each stripe generally extends fully along the radial direction of the BCA.

According to current industry standards, the BCA is located between 22.3(+0/−0.4)mm and 23.50±0.05 mm from the center of the center hole of the disc. Further, the starting diameter of the lead-in area should not exceed 44.5 mm when the BCA code is applied. Under current standards, BCA code generally should includes a BCA preamble field, a BCA data field and a BCA postamble field. All of these fields are written continuously without gaps. The BCA preamble field should include 4 preamble bytes preceded by a BCA-sync-byte. The BCA data field should include information data, 4 bytes of error detection code and 16 bytes of error correction code, in the stated order. The size of the information data is approximately 16 n-4 bytes, where the variable "n" in the information data is a positive integer not greater than 12. The 4-byte error detection code should be attached to information data. A Reed-Soloman type error correction code ("ECC") with 4-way interleave should be adopted for the information data and the BCA error detection code. Reed-Soloman is a well known method for error correction. A BCA-Resync is inserted before every 4 bytes throughout the data field. The BCA postamble field includes 4 postamble bytes preceded and followed by BCA-Resync.

When reading information from the main storage area of an optical disc, light from a laser beam is directed onto the track and the light beam is reflected back to a photo-sensor, such as a photo-diode. Because the pits and lands exhibit different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, that is proportional to the energy of the light in the reflected light beam. FIG. 1 illustrates the relationship between the RF signal and the pits and lands. In particular, smaller pits or lands decrease both the period and the amplitude of the RF signal. In addition, the polarity of the RF signal changes when going from pits to lands and vice versa.

When reading data from the main storage area of a DVD disc, a search is performed to position an optical head assembly over a target region of the spiral track. To keep the optical head assembly properly positioned over the spiral track in the main storage area, electronic control circuitry generates a track error signal from the light reflected from the spiral track to the photo-sensor. However, in the burst cutting area, there is no track error signal to control the positioning of the optical head assembly. Thus, it is desirable to provide methods and apparatus to efficiently reach the burst cutting area and read the BCA code contained therein.

SUMMARY OF THE INVENTION

A method for reading information recorded on a DVD having a first encoded data area and a second encoded data area, the second encoded data area using a different encoding format from the first encoded data area, includes the steps of determining a present location of an optical head assembly, calculating a distance from the present location of the optical head assembly to the second encoded data area, moving the optical head assembly by the calculated distance from the present location toward the second encoded data area and retrieving encoded data recorded at the second encoded data area. The retrieving step includes locating a determined synchronization pattern and transferring the second encoded data into a data buffer when the synchronization pattern is located. The method also includes the steps of error checking the second encoded data, and repeating the calculating, moving, and retrieving steps if an error is found. If no error is found in the error checking step, the retrieved second encoded data is transferred from the data buffer to a host. In an exemplary embodiment, the second encoded data area is a burst cutting area.

A computer readable medium for reading information recorded on a DVD, the disc having a first encoded data area and a second encoded data area, the second encoded data area using a different encoding format from the first encoded data area, includes logic code for determining a present location of a optical head assembly, logic code for calculating a distance from the present location to the second encoded data area, logic code for moving the optical head assembly by the calculated distance from the present location toward the second encoded data area and logic code for retrieving encoded data recorded at the second encoded data area. The logic code for retrieving includes logic code for locating a determined synchronization pattern and logic code for transferring the second encoded data into a data buffer when said synchronization pattern is located. The computer readable medium also includes logic code for checking error in the second encoded data, and logic code for repeating the calculating, moving, and retrieving logic codes if an error is found. If no error is found, the computer readable medium includes logic code for transferring the retrieved second encoded data from the data buffer to a host. In an exemplary embodiment, the second encoded data area is a burst cutting area.

A computer software product for reading information recorded on a DVD, the information including first encoded data and second encoded data, the disc having a first encoded data area storing the first encoded data and a second encoded data area storing the second encoded data, the second encoded data having a different encoding format from the first encoded data, includes modules for reading data from the second encoded area on the disc. The computer software product includes a first module for determining a present position of the optical head assembly, a second module for calculating a distance from the present position of the optical head assembly to the second encoded area, a third module for moving the optical head assembly by the calculated distance toward the second encoded area, and a fourth module for retrieving the second encoded data. The fourth module for retrieving includes a first submodule for locating a determined synchronization pattern and a second submodule for transferring the second encoded data into a data buffer when said synchronization pattern is located. The computer software product also includes a fifth module for error checking of the second encoded data, and a sixth module for returning to the calculating, moving, and retrieving modules if an error is found. If no error is found by the fifth module, the retrieved second encoded data is transferred from the data buffer to a host.

DETAILED DESCRIPTION OF THE INVENTION

Figure 1:
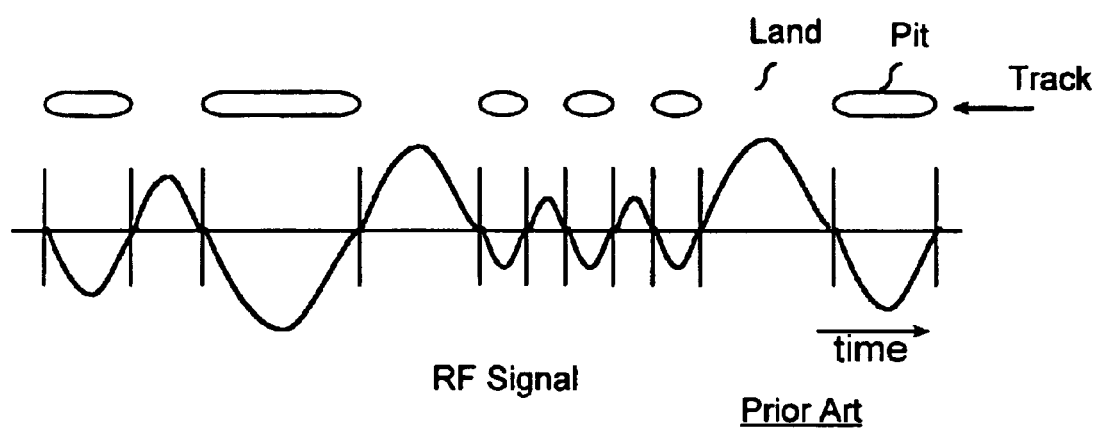
FIG. 1 illustrates the relationship between an analog RF signal and the pits and lands on a disc.
Figure 2A:
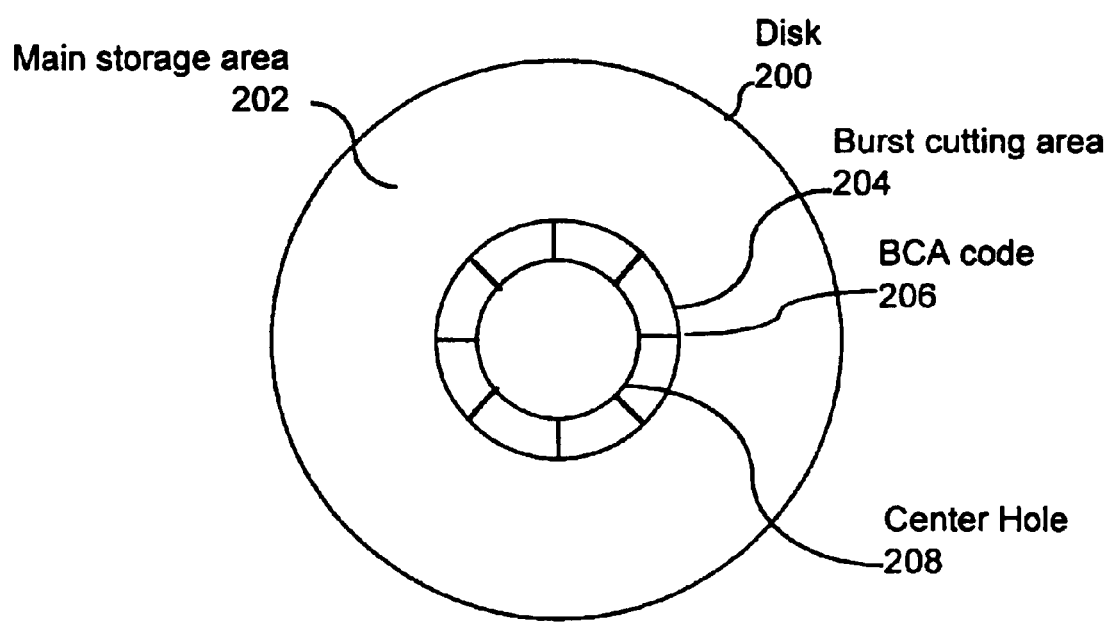
FIG. 2A illustrates an exemplary disc having a main storage area and a burst cutting area.

FIG. 2A illustrates an exemplary DVD disc 200. The disc 200 stores data in a main storage area 202 and in a burst cutting area 204. In the main storage area 202, data is stored in a spiral track. In the burst cutting area 204, BCA code 206 is stored.

Figure 2B:
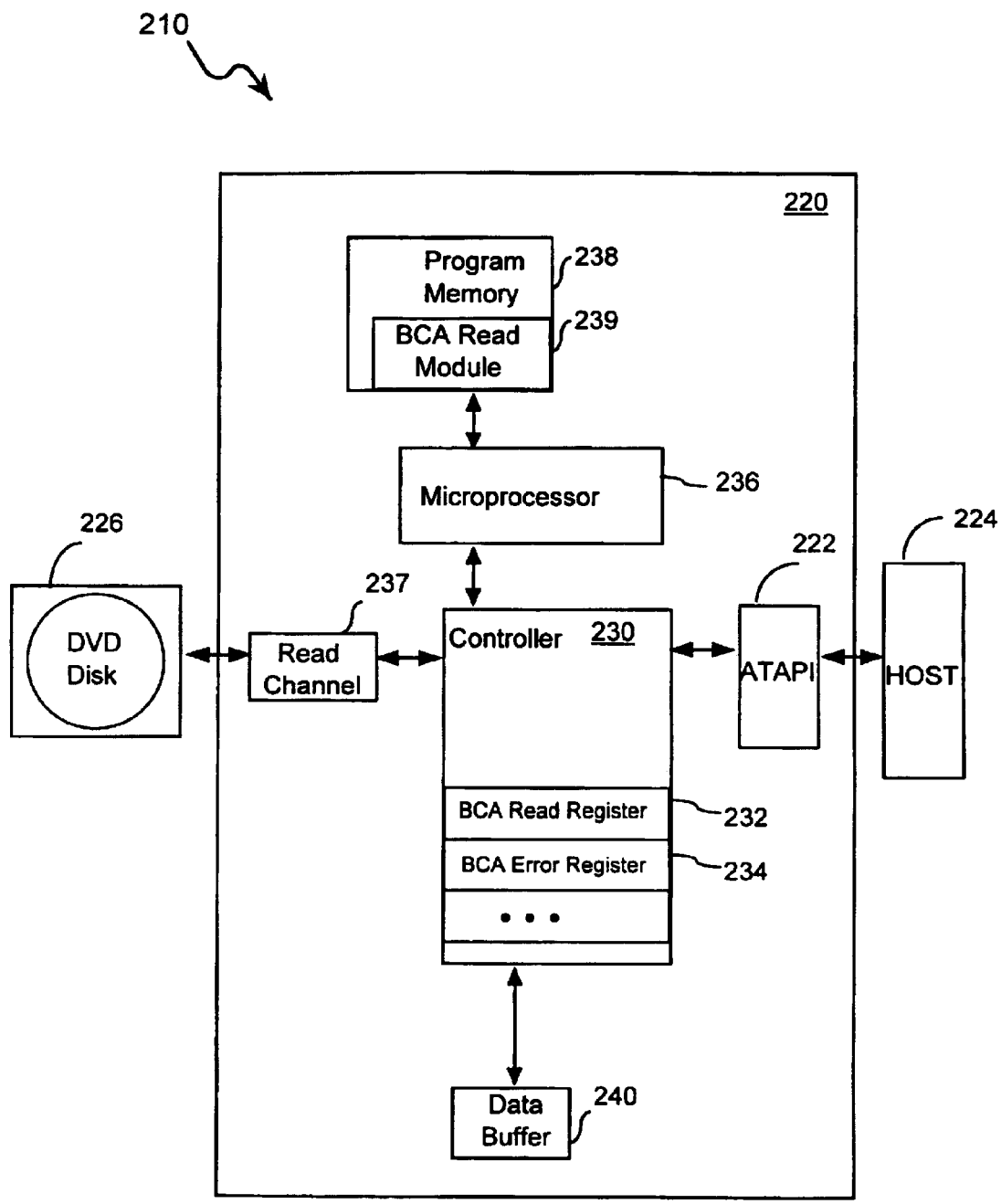
FIG. 2B illustrates an exemplary system in accordance with an embodiment of the present invention.

FIG. 2B shows an exemplary system for an embodiment of this invention. The exemplary system 210 contains a DVD interface circuit 220, which operates as an interface between a DVD disc drive 226 and a host 224. The DVD interface circuit 220 includes an Advanced Technology Attachment Packet Interface ("ATAPI") interface 222, microprocessor 236, a controller 230, a read channel 237, a program memory 238 and a data buffer 240. The controller 230 includes a BCA read register 232 and a BCA error register 234. The read channel 237 is an optical storage read channel that processes any received analog signals to create outgoing digital data streams. The processes performed by the read channel 237 include amplifying analog signals, filtering amplified signals, and creating digital data streams from the filtered signals. In an exemplary embodiment, the read channel 237 can be incorporated in the controller 230. The program memory 238 includes a BCA read module 239 which contains computer programs to read data from the BCA on a DVD disc (see FIG. 4). The computer programs of the BCA read module are executed by the microprocessor 236.

Typically, the default of the DVD interface circuit 220 is to read data from the main storage area 202 of a DVD (see FIG. 2A). To override the default, when the host 224 issues a request to read BCA data, the microprocessor 236 updates the BCA read register 232 so that the controller 230 will recognize that BCA data is being requested. The microprocessor 236 provides instructions to the controller 230 to read BCA data. Pursuant to the microprocessor instructions, BCA data is read and transferred from a DVD associated with the DVD disc drive 226, stored in the data buffer 240, and then transferred to the host 224 through the ATAPI interface 222.

Figure 3A:
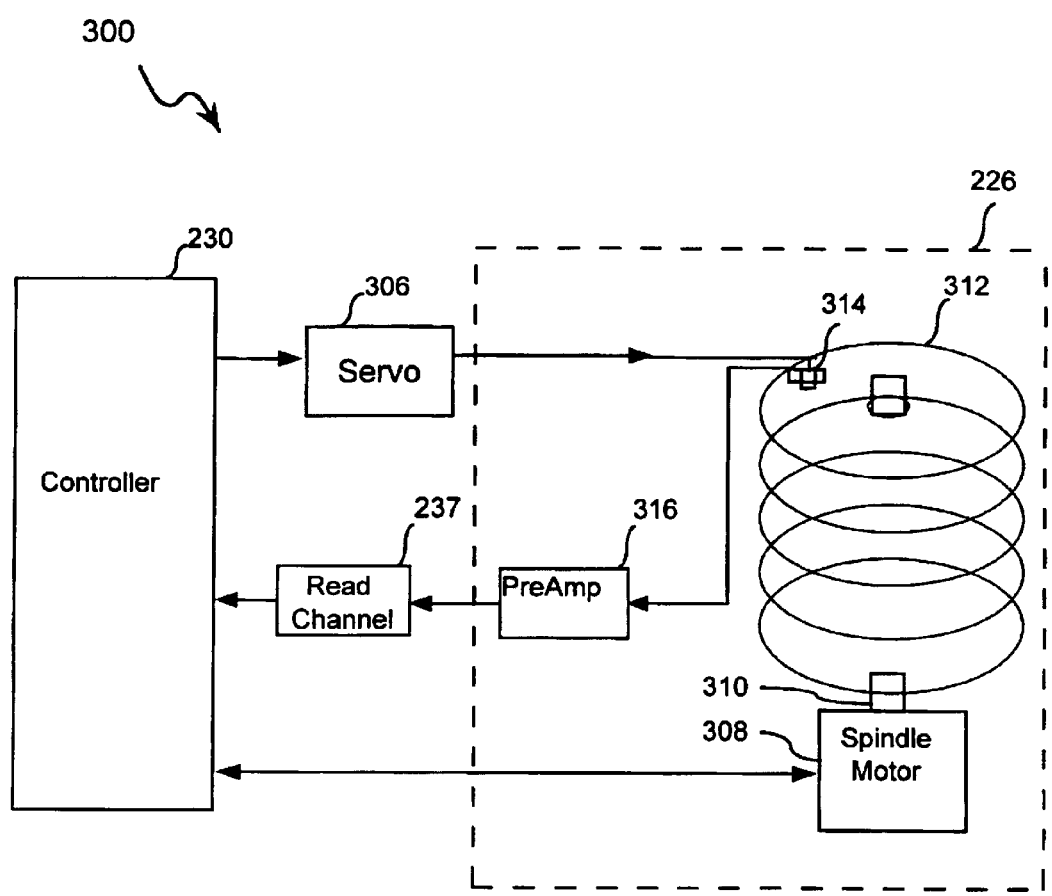
FIG. 3A illustrates an exemplary embodiment of the relationship between a disc drive system and a controller in accordance with the present invention.

FIG. 3A illustrates an exemplary embodiment of a the relationship between the DVD disc drive 226 and the controller 230. The controller 230 connects to the DVD disc drive 226 through a servo 306. In the disc drive 226, a spindle motor 308 is attached to a spindle 310 which supports at least one disc 312. In response to instructions from the microprocessor 236 (FIG. 2B) and implemented through the controller 230, the spindle motor 308 rotates the spindle 310 and therefore the disc 312. While the disc 312 is rotating, an optical head assembly 314 reads information from the disc 312. The microprocessor 236 controls the optical head assembly 314 through the controller 230 by providing instructions for the servo 306 to position the optical head assembly 314 with respect to a target area on the disc 312. A preamplifier 316 receives an analog RF signal from the positioned optical head assembly 314 and outputs an analog read channel signal to the read channel 237. The read channel 237 processes the received analog signal and outputs a digital data stream to the controller 230.

Figure 3B:
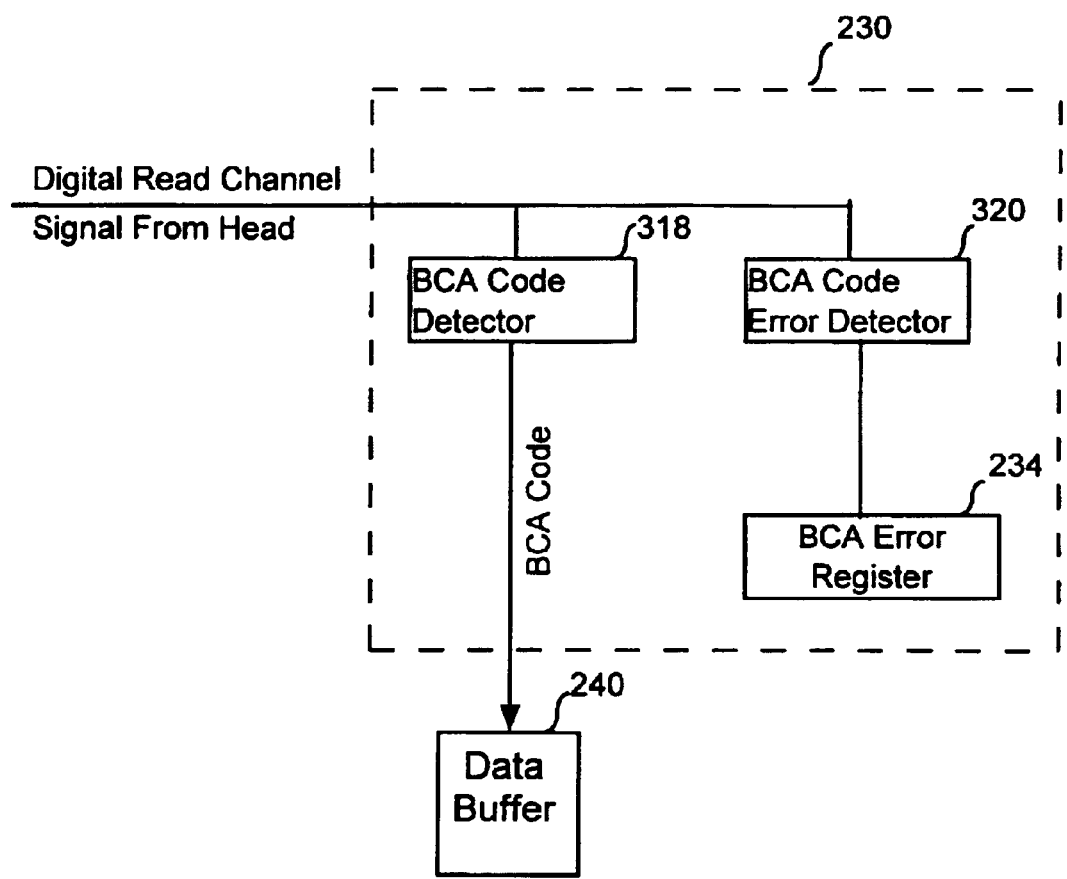
FIG. 3B illustrates a portion of a controller in accordance with an embodiment of the present invention.

FIG. 3B is a block diagram of an exemplary embodiment of a portion of the controller 230. Pursuant to a seek instruction issued by the microprocessor 236 and executed by the controller 230, the servo 306 locates the BCA and a digital read channel signal is supplied from the read channel 237 to a BCA code detector 318 and a BCA code error detector 320 in the controller 230. The BCA code detector 318 derives and decodes the BCA code from the digital read channel signal and inputs the BCA code into a data buffer 240. The BCA code error detector 320 determines whether the digital read channel signal and/or the decoded BCA code has an error. In an exemplary embodiment, if no error is detected, a "zero" is recorded in a BCA error register 234. In an exemplary embodiment, if an error is detected, a "one" is recorded in the BCA error register 234. If a "one" is recorded in the BCA error register 234, the microprocessor 236 issues a second seek instruction, which is implemented by the controller 230, to the servo 306 (see FIG. 3A). The servo 306 recalculates a distance between the present location of the optical head assembly 314 and the BCA, then positions the optical head assembly 314 accordingly. The processes of issuing instruction, calculating a distance, moving toward the BCA, reading data, and error checking are repeated for a finite count or until the BCA error register 234 has the value of "zero," whichever occurs first.

Figure 4:
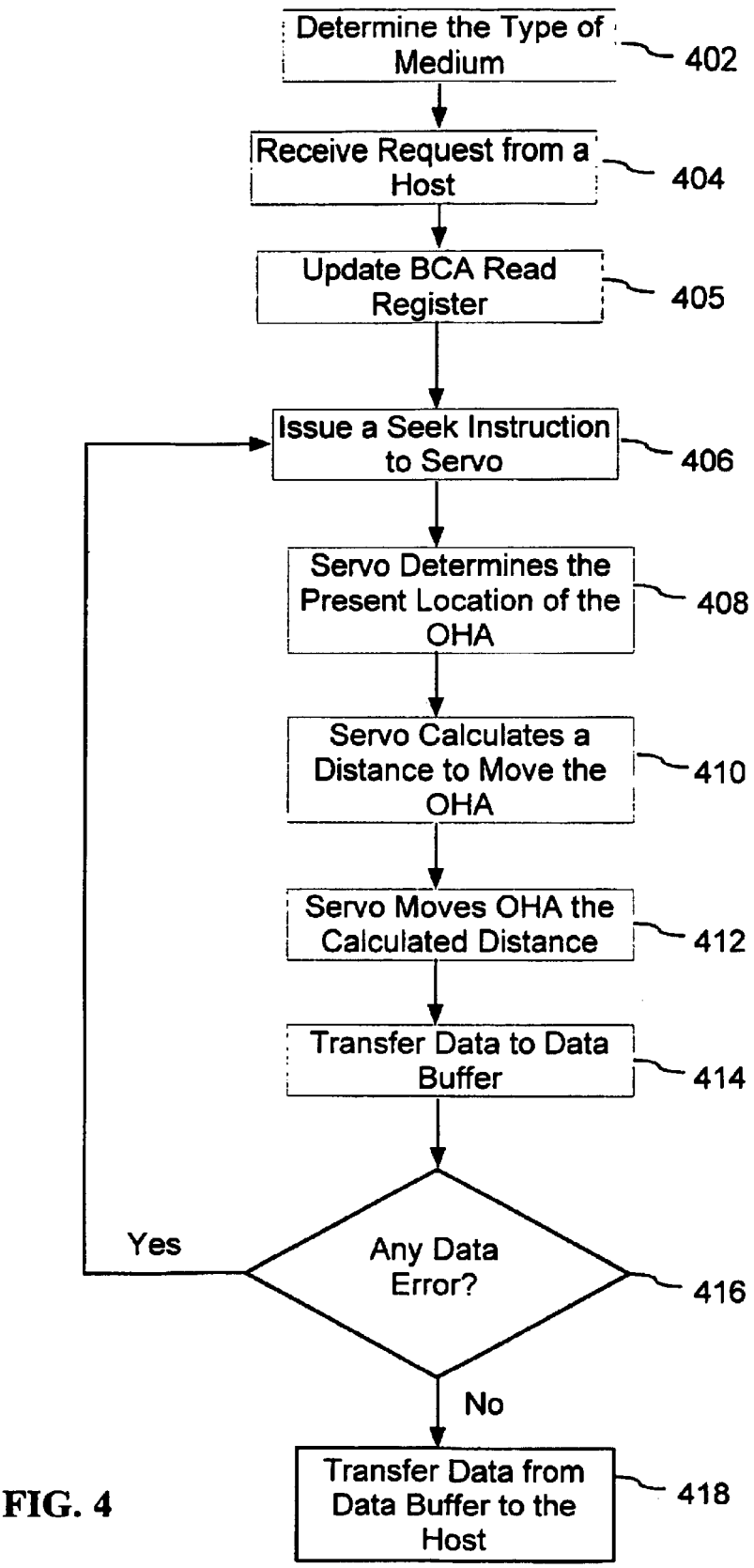
FIG. 4 illustrates a flow chart of an exemplary process in accordance with an embodiment of the present invention.

FIG. 4 is a flow chart illustrating an exemplary process of the BCA Read Module (FIG. 2B, 239) to read data from the BCA on a DVD disc. Many systems are capable of reading more than one type of optical disc (i.e., CD and DVD). Typically, these systems need to first determine a disc type before attempting to read the disk (step 402). Step 402 may be omitted if the system is capable of reading only one type of disc. At step 404, the system receives a request from a host to retrieve the BCA code. Upon receipt of the host request, the microprocessor updates a BCA read register to inform the controller that BCA data is requested (step 405). Typically, the system default is to read data from the main storage area, not the BCA, of the disc. The microprocessor issues a seek instruction to the servo through the controller (step 406). The servo determines the present location of the optical head assembly (step 408). At step 410, the servo calculates an approximate distance to move the optical head assembly from its present location to the BCA. The servo moves the optical head assembly according to the calculated distance (step 412). Once the optical head assembly reaches its destination, data is automatically transferred into a data buffer (step 414). As data is transferred, the controller checks for any error (step 416). If an error is detected, the system repeats the process from step 406. If no error is detected, the read BCA data is transferred from the data buffer to the host (step 418).

In an exemplary embodiment, the microprocessor 236 issues instructions, which are executed by the controller 230, to move the optical head assembly 314 a calculated distance toward the BCA on a DVD disc. The controller 230 implements the instruction by using the servo 306 to move the optical head assembly 314. When a predetermined sync pattern of the BCA field is recognized by the controller 230, the controller 230 latches a BCA Sync in a register at the controller 230. Once a BCA Sync bit is received, data is automatically transferred to the data buffer 240 (see FIG. 3B). As data is being read, the BCA code error detector 320 in the controller 230 begins error checking. In an exemplary embodiment, the results of the error check is latched into a BCA error register 234. If no error is detected, the microprocessor 236, through the controller 230, transfers the BCA code from the data buffer 240 to the host. If an error is detected, the microprocessor 236 issues another seek instruction through the controller 230 to the servo 306. The servo 306 recalculates another distance to move the optical head assembly 314 based on the optical head assembly's present location, then moves the optical head assembly accordingly. This process is repeated until a zero is recorded in the BCA error register 234 or a stop condition, whichever occurs first.

It will be apparent, therefore, that variations and modifications may be made to the described embodiments, with the attainment of all or some of the advantages. It is the object of the appended claims, therefore, to cover all such variations and modifications as come within the spirit and scope of the invention.

What is claimed is:

1. A method of reading information recorded on a DVD having a first encoded data area and a second encoded data area, the second encoded data area using a different encoding format from the first encoded data area, comprising the steps of:
   determining a present location of an optical head assembly;
   calculating a distance from said present location of said optical head assembly to said second encoded data area;
   moving said optical head assembly by said calculated distance from said present location toward said second encoded data area;
   retrieving encoded data recorded at said second encoded data area, wherein said retrieving includes locating a determined synchronization pattern in said second encoded data area and transferring said second encoded data into a data buffer after said synchronization pattern is located;
   checking for errors in said retrieved encoded data, and
   repeating said calculating, moving, and retrieving steps if an error is found.

2. The method of claim 1, further comprising the step of transferring said second encoded data from said data buffer to a host if no error is found in said checking step.

3. The method of claim 1 wherein said second encoded data area is a burst cutting area.

4. A computer readable medium for reading information recorded on a DVD, the DVD having a first encoded data area and a second encoded data area, the second encoded data area using a different encoding format from the first encoded data area, comprising:
   logic code for determining a present location of a an optical head assembly;
   logic code for calculating a distance from said present location to said second encoded data area;
   logic code for moving said optical head assembly by said calculated distance from said present location toward said second encoded data area;
   logic code for retrieving encoded data recorded at said second encoded data area, wherein said logic code for retrieving includes logic code for logic code for locating a determined synchronization pattern in said second encoded data area and logic code for transferring said second encoded data into a data buffer after said synchronization pattern is located;
   logic code for error checking in said second encoded data, and
   logic code for repeating said calculating, moving, and retrieving logic codes if an error is found.

5. The computer readable medium of claim 4, further comprising:
   logic code for transferring said second encoded data from said data buffer to a host if no error is found.

6. The computer readable medium of claim 5, wherein said second encoded data area is a burst cutting area.

7. A computer software product for reading information recorded on a DVD, said information including first encoded data and second encoded data, said DVD having a first encoded data area storing said first encoded data and a second encoded data area storing said second encoded data, said second encoded data having a different encoding format from said first encoded data, said computer software product comprising modules for reading data from said second encoded area on said DVD, comprising:
   a first module for determining a present position of an optical head assembly;
   a second module for calculating a distance from said present position of said optical head assembly to said second encoded area;
   a third module for moving said optical head assembly by said calculated distance toward said second encoded area;
   a fourth module for retrieving said second encoded data, wherein said fourth module includes a first submodule for locating a determined synchronization pattern in said second encoded data area and a second submodule for transferring said second encoded data into a data buffer after said synchronization pattern is located;
   a fifth module for error checking in said second encoded data, and
   a sixth module for returning to said second, third and fourth modules if an error is found.

8. The computer software product of claim 7, further comprising a seventh module for transferring said second encoded data from said data buffer to a host if no error is found.

9. The computer software product of claim 7, wherein said second encoded data area is a burst cutting area.

* * * * *